(12) United States Patent
Das et al.

(10) Patent No.: US 10,114,935 B2
(45) Date of Patent: Oct. 30, 2018

(54) TECHNOLOGIES FOR LOGIN PATTERN BASED MULTI-FACTOR AUTHENTICATION

(71) Applicant: Intel Corporation, Santa Clara, CA (US)

(72) Inventors: Barnan Das, San Jose, CA (US); Abhilasha Bhargav-Spantzel, Santa Clara, CA (US); Narayan Biswal, Folsom, CA (US); Micah J. Sheller, Hillsboro, OR (US); Ned M. Smith, Beaverton, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/580,817

(22) Filed: Dec. 23, 2014

(65) Prior Publication Data

US 2016/0180068 A1 Jun. 23, 2016

(51) Int. Cl.
*H04L 29/00* (2006.01)
*G06F 21/32* (2013.01)
*H04L 29/06* (2006.01)
*G06F 21/31* (2013.01)

(52) U.S. Cl.
CPC ............ *G06F 21/32* (2013.01); *G06F 21/316* (2013.01); *H04L 63/0861* (2013.01); *H04L 63/1408* (2013.01); *H04L 2463/082* (2013.01)

(58) Field of Classification Search
CPC ...................................................... G06F 21/32
See application file for complete search history.

(56) References Cited

U.S. PATENT DOCUMENTS

| 9,430,629 | B1* | 8/2016 | Ziraknejad | G06F 21/32 |
| 2005/0232470 | A1* | 10/2005 | Chaudhari | G07C 9/00158 382/115 |
| 2008/0118042 | A1* | 5/2008 | Hogg | H04M 3/2281 379/93.03 |
| 2009/0106820 | A1* | 4/2009 | Park | G06F 21/32 726/2 |
| 2013/0239206 | A1* | 9/2013 | Draluk | G06F 21/00 726/19 |

(Continued)

*Primary Examiner* — Brandon S Hoffman
*Assistant Examiner* — Helai Salehi
(74) *Attorney, Agent, or Firm* — Barnes & Thornburg LLP

(57) ABSTRACT

Technologies for multi-factor authentication of a user include a computing device with one or more sensors. The computing device may authenticate the user by analyzing biometric and/or environmental sensor data to determine whether to allow the user access to a computing device. To do so, the computing device may determine reliability scores based on the environment during authentication for each biometric authentication factor used to authenticate the user. Additionally, the computing device may determine a login pattern based on sensor data collected during historical authentication attempts by the user over a period of time. The computing device may apply a machine-learning classification algorithm to determine classification rules, based on the login pattern, applied by the computing device to determine whether to allow the user access to the computing device. Other embodiments are described herein and claimed.

25 Claims, 8 Drawing Sheets

(56) References Cited

U.S. PATENT DOCUMENTS

| | | | | |
|---|---|---|---|---|
| 2013/0267204 A1* | 10/2013 | Schultz | .................. | G06F 21/32 |
| | | | | 455/411 |
| 2016/0253995 A1* | 9/2016 | Zhou | ...................... | G10L 15/20 |
| | | | | 704/233 |

* cited by examiner

TECHNOLOGIES FOR LOGIN PATTERN BASED MULTI-FACTOR AUTHENTICATION

BACKGROUND

Typical computing devices may include several technical methods for user authentication. For example, a computing device may support user credential authentication, biometric authentication factors (e.g., fingerprint, facial, voice, and/or retina scanning), security token authentication, or other technical authentication measures. However, many of these authentication methods may be compromised by theft and/or may be impacted by environmental conditions, such as lighting, background noise, etc. Some typical computing devices endeavor to prevent a compromised or environmentally impacted authentication by providing a multi-factor authentication (i.e., more than one user authentication method). For example, a computing device may provide a facial recognition authentication factor and a voice recognition factor, or a fingerprint authentication factor and a retina authentication factor, or any combination of biometric authentication factors that result in more than one biometric authentication factor being used.

Typical computing devices implementing multi-factor authentication using biometric authentication factors rely on static runtime data gathered from various biometric sensors (e.g., cameras, microphones, etc.) to generate a combined score of the biometric authentication factors to authenticate a user of the computing device. The combined score is generally a result of a confidence score for each of the biometric authentication factors that are generated by the software performing each biometric authentication factor. The confidence score is typically a distance measure from a curve/plane/hyperplane that is used to determine an authorization action (e.g., authorized or not authorized, valid or invalid, etc.) or a probability measure for recognition.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
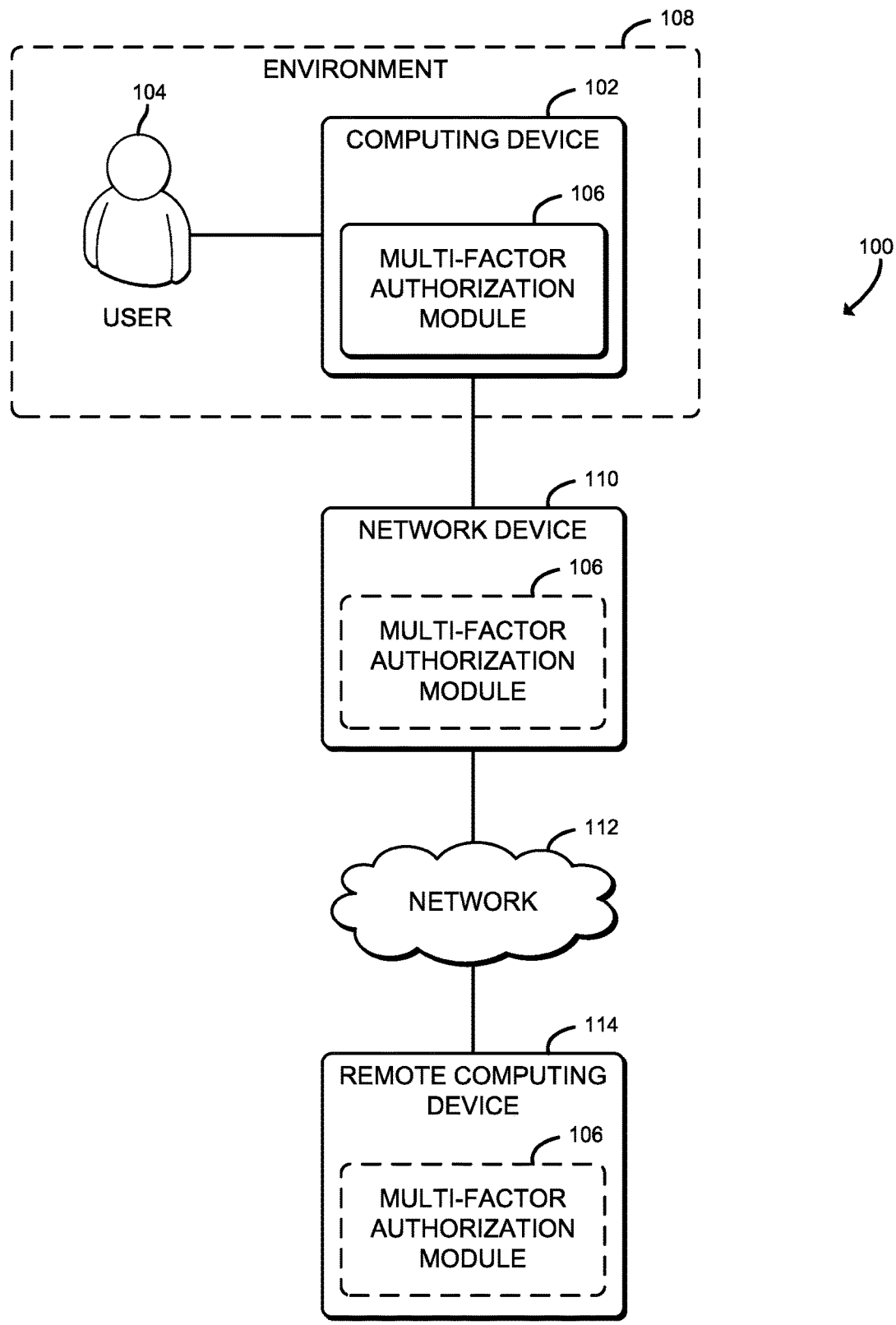
FIG. 1 is a simplified block diagram of at least one embodiment of a system for multi-factor user authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for multi-factor user authentication includes a computing device 102 and a remote computing device 114 in communication over a network 112 via a network device 110. In use, as described in more detail below, in some embodiments a user 104 may attempt to authenticate to the computing device 102, for example, using more than one biometric authentication factor. In some embodiments, the user 104 may additionally attempt to authenticate to the computing device using textual login credentials (e.g., username, password, passphrase, PIN, etc.). Additionally or alternatively, in some embodiments, the computing device 102 may be compatible with other authentication measures, such as a security token.

After the biometric input of the user 104 has been received by the computing device 102, the computing device 102 analyzes sensor data corresponding to the biometric authentication factors input by the user 104 and determines whether or not to authorize the user 104. Unlike traditional multi-factor biometric authentication systems that generally make authorization determinations (i.e., authentication results) using only static biometric data collected at runtime, a multi-factor authorization module 106 of the computing device 102 of system 100 is configured to perform an authorization action based on a login pattern determined using data collected over previous authentication attempts. The previously collected data may include authenticated biometric data, physical features of the user 104, and/or physical data of an environment 108 (e.g., a lighting condition, a level of background noise, etc.) around the computing device 102.

To determine whether to authorize access to the user 104, the computing device 102 collects confidence scores for each biometric authentication factor being used to authenticate the user 104 and determines a reliability score (i.e., weight) based on physical factors of the environment 108, depending on which biometric authentication factors are being used, in the vicinity around the user 104 and the computing device 102 at the time of the authentication attempt. For example, a computing device 102 using both facial recognition authentication and voice recognition authentication may take into account the lighting conditions when determining a reliability score for the facial recognition authentication and a noise level when determining a reliability score for the voice recognition authentication.

The multi-factor authorization module 106 is further configured to determine classification rules (i.e., a classification model) to determine whether to authorize access to the user 104. The classification rules may be based on the login pattern of the user 104 using a machine-learning classification algorithm, or a machine-learning classifier. As previously described, the computing device 102 may monitor behavioral context data (e.g., location, time of day, etc.) associated with the biometric authentication factors performed by the user 104 over a period of time to determine the login pattern. As such, the login pattern may indicate which biometric authentication factors are more reliable based on location of the authentication attempt, the time of day the authentication is attempted, and/or other behavioral context data.

In some embodiments, the computing device 102 may receive historical authentication classifications and corresponding data for the classification algorithm from the remote computing device 114. The historical data may be based on sensor data from other computing devices and/or authentication classifications observed during previous login attempts by the user 104 at other computing devices the user 104 may have used to authenticate their identity in the past.

In some embodiments, the authorization determination may be performed by a multi-factor authorization module 106 external to the computing device 102. In other words, the biometric sensor data may be collected by the computing device 102 and then transmitted to the network device 110 or the remote computing device 114 for further processing by the multi-factor authorization module 106. In such embodiments, a secure connection with the network device 110 or the remote computing device 114 may be established. The computing device 102 may use any technique to establish the secure connection that preserves the security and/or anonymity of sensor data stored by the computing device 102. For example, the computing device 102 may open a connection using the Sign-and-MAC (SIGMA) protocol. Additionally, the computing device 102 may download an authentication determination from the remote multi-factor authorization module 106 via the secure connection to be used by the computing device to allow or deny access to the user 104.

Additionally or alternatively, in use, as described in more detail below, in some embodiments of the computing device 102 may establish a secure environment, such as a trusted execution environment, and monitor one or more sensors of the computing device 102 from within the secure environment. For example, to protect the privacy and/or security of the data of the user 104, the computing device 102 may apply the machine-learning classification algorithm to the sensor data within the secure environment to identify the reliability scores and/or login patterns. As such, the computing device 102 may improve security. Additionally, by collecting and analyzing potentially sensitive sensor data within a trusted execution environment, user privacy may be protected.

In use, as will be described in more detail below, the multi-factor authorization module 106 may be embodied as hardware, firmware, software, or a combination thereof. For example, in some embodiments, the multi-factor authorization module 106 may be embodied as a special purpose circuit for performing the functions described herein. As illustrated in FIG. 1, the multi-factor authorization module 106 may be located in the computing device 102, the network device 110, and/or the remote computing device 114. For example, the computing device 102 may include various sensors, as will be described in further detail below, to collect data of the user 104 and the environment 108, aggregate the collected data, and transmit the aggregated data to the network device 110 and/or the remote computing device 114 for further processing by the multi-factor authorization module 106. In such embodiments, the network device 110 and/or the remote computing device 114 may then respond to the computing device 102 with an authentication classification, or authorization result.

The network device 110 may be embodied as any type of device capable of facilitating wired and/or wireless network communications between the network 112 and the computing device 102, and performing the functions described herein. For example, the network device 110 may be embodied as, without limitation, an access point, a router, a switch, a network hub, etc. Additionally, as discussed previously and shown in FIG. 1, in some embodiments, the multi-factor authorization module 106 may be included in the network device 110.

The network 112 may be embodied as any type of wired or wireless communication network, including cellular networks (e.g., Global System for Mobile Communications (GSM)), digital subscriber line (DSL) networks, cable networks, telephony networks, local or wide area networks, global networks (e.g., the Internet), or any combination thereof. Additionally, the network 112 may include any number of additional network communication devices (e.g., computers, routers, switches, servers, storage devices, etc.) as needed to facilitate communication between the respective devices of system 100.

The remote computing device 114 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server (e.g., stand-alone, rack-mounted, blade, etc.), a network appliance (e.g., physical or virtual), a web appliance, a distributed computing system, a processor-based system, and/or a consumer electronic device. In use, the remote computing device 114 is configured to communicate with the computing device 102 over the network 112 via one or more network devices 110. Additionally, as discussed previously and shown in FIG. 1, in some embodiments, the multi-factor authorization module 106 may be included in the remote computing device 114.

Figure 2:
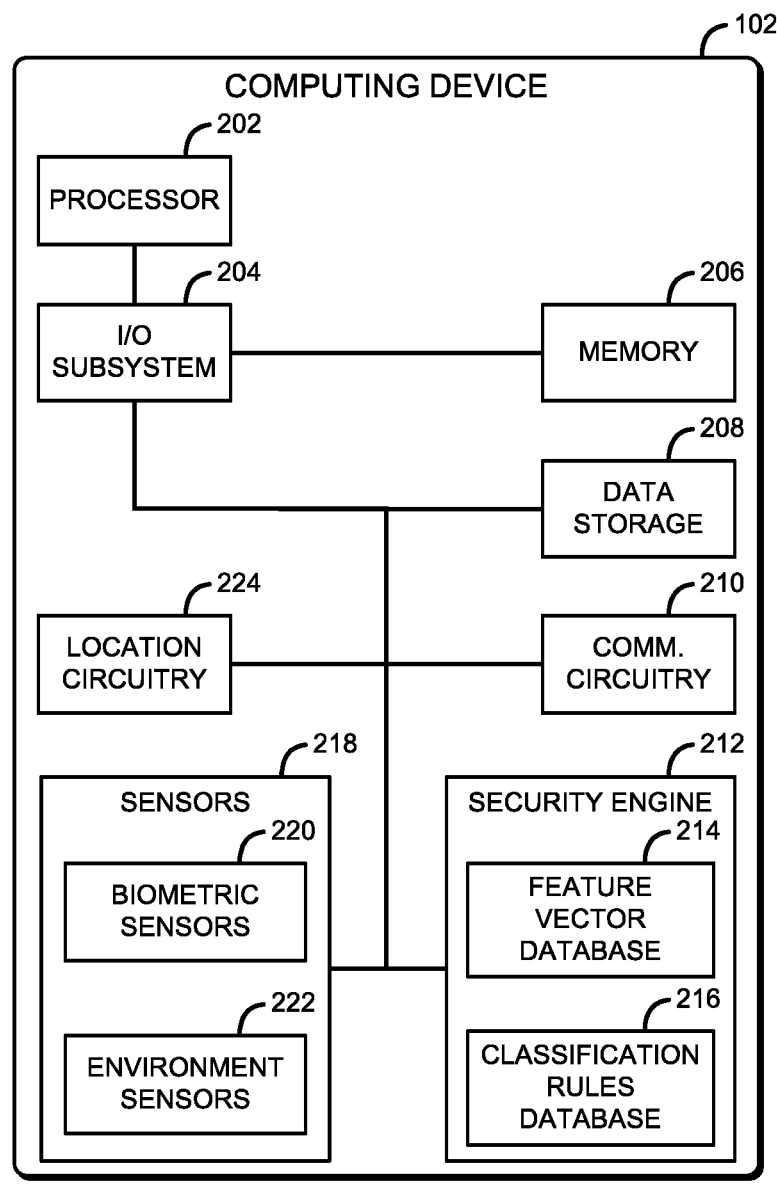
FIG. 2 is a simplified block diagram of at least one embodiment of a computing device of the system of FIG. 1.

The computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 2, the illustrative computing device 102 includes a processor 202, an input/output (I/O) subsystem 204, a memory 206, a data storage device 208, communication circuitry 210, a security engine 212, a number of sensors 218, and location circuitry 224. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 206, or portions thereof, may be incorporated in one or more processors 202 in some embodiments.

The processor 202 may be embodied as any type of processor capable of performing the functions described herein. The processor 202 may be embodied as a single or multi-core processor(s), digital signal processor, microcontroller, or other processor or processing/controlling circuit. The memory 206 may be embodied as any type of volatile or non-volatile memory or data storage capable of performing the functions described herein. In operation, the memory 206 may store various data and software used during operation of the computing device 102 such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the computing device 102. For example, the I/O subsystem 204 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processors 202, the memory 206, and other components of the computing device 102, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. In some embodiments, the data storage device 208 may be used to store the contents of one or more trusted execution environments. When stored by the data storage device 208, the contents of the trusted execution environments may be encrypted to prevent access by unauthorized software.

The communication circuitry 210 of the computing device 102 may be embodied as any communication circuit, device, or collection thereof, capable of enabling communications between the computing device 102, the network device 110, and/or the remote computing device 114 over the network 112. The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The security engine 212 may be embodied as any hardware component(s) or circuitry capable of establishing a trusted execution environment (TEE) on the computing device 102. In particular, the security engine 212 may support executing code and/or accessing data that is independent and secure from other code executed by the computing device 102. The security engine 212 may be embodied as a Trusted Platform Module (TPM), a manageability engine (ME), an out-of-band processor, or other security engine device or collection of devices. In some embodiments the security engine 212 may be embodied as a converged security and manageability engine (CSME) incorporated in a system-on-a-chip (SoC) of the computing device 102. Further, in some embodiments, the security engine 212 is also capable of communicating using the communication circuitry 210 or a dedicated communication circuit independently of the state of the computing device 102 (e.g., independently of the state of the main processor 202), also known as "out-of-band" communication. The security engine 212 additionally includes a classification rules database 216 for securely storing classification rules and a feature vector database 214 for securely storing feature vectors, which may be used by the multi-factor authorization module 106 for performing the authorization action.

The sensors 218 may include sensors to detect physical factors of the environment 108 and/or the user 104. In some embodiments, the processor 202, I/O subsystem 204, and/or other system on a chip (SoC) component may include an integrated sensor hub that may record or otherwise monitor data produced by the sensors 218 while the computing device 102 is in a low-power state. The sensors 218 of the computing device 102 include various biometric sensors 220 and environment sensors 222, which are described in further detail below.

The biometric sensors 220 may include any sensor that measures a physiological attribute of the user 104 of the computing device 102. The biometric sensors 220 may be integrated with or otherwise used by an authentication subsystem of the computing device 102. The biometric sensors 220 may include, for example, a fingerprint reader, a retina scanner, a facial recognition scanner, a voice recognition scanner, a location determination device, etc., which are not shown in FIG. 2 to preserve clarity of the description.

In some embodiments, the fingerprint reader may be embodied as any sensor capable of interpreting fingerprint input of the user 104. For example, the fingerprint reader may be embodied as a fingerprint scanner or other sensor capable of capturing the unique lines and spaces of a fingerprint of the user 104. In some embodiments, the retina scanner may be embodied as any sensor capable of interpreting retinal input of the user 104. For example, the retina scanner may be embodied as an infrared sensor or other sensor capable of capturing a blood vessel pattern in a retina of an eye of the user 104. In some embodiments, the facial recognition scanner may be embodied as any sensor capable of interpreting facial input of the user 104. For example, the facial recognition scanner may be embodied as a video input or other sensor capable of capturing image signals, such as a camera, which may be operable by the user 104 to capture an image of a face of the user 104. In some embodiments, the voice recognition scanner may be embodied as any sensor capable of interpreting voice input of the user 104. For example, the audio sensor may be embodied as an audio input or other sensor capable of capturing audio signals, such as a microphone, a line input jack and associated circuitry, an analog-to-digital converter (ADC), or other type of audio sensor. Of course, in other embodiments, the computing device 102 may include additional and/or alternative biometric sensors 220.

The environment sensors 222 may include, for example, any sensor capable of detecting physical features of the user 104 and/or physical factors of the environment 108, such as a camera, a microphone, a thermal imaging sensor, a skin conductance sensor, and/or a heart rate sensor, which are not shown in FIG. 2 to preserve clarity of the description. In some embodiments, the camera may be embodied as a digital camera or other digital imaging device integrated with the computing device 102 or otherwise communicatively coupled thereto. The camera may include an electronic image sensor, such as an active-pixel sensor (APS), e.g., a complementary metal-oxide-semiconductor (CMOS) sensor, or a charge-coupled device (CCD). The camera may be used to capture images of the environment 108 and/or the user 104 of the computing device 102 including, in some embodiments, capturing still images or video images. In some embodiments, the microphone may be embodied as any sensor capable of interpreting audible input of the user 104 and background noise in the environment 108. The thermal imaging sensor may be embodied as any sensor capable of measuring temperature of the environment 108 and/or the user 104 of the computing device 102. For example, the thermal imaging sensor 144 may be embodied as a thermal imaging camera or a thermographic camera.

In some embodiments, the skin conductance sensor, also known as a galvanic skin response (GSR) sensor, may be embodied as a sensor that, when placed in contact with the user's 104 skin, measures the electrical conductance of the skin. Electrical conductance of the skin varies with the skin's moisture level, and thus may indicate activity of the sweat glands, which in turn is may indicate the existence of a physiological or psychological condition. In some embodiments, the heart rate sensor may be embodied as a sensor that detects the pulse rate of the user 104, for example by measuring minute color changes in the user's 104 skin and/or eyes caused by pulsing blood. Additionally or alternatively, other sensors may be used as the heart rate sensor, such as the thermal imaging sensor, for example. Of course, in other embodiments, the computing device 102 may include additional and/or alternative environment sensors.

The location circuitry 224 may be embodied as any type of circuit capable of determining the precise or approximate position of the computing device 102. For example, the location circuitry 224 may be embodied as a global positioning system (GPS) receiver, capable of determining the precise coordinates of the computing device 102. In other embodiments, the location circuitry 224 may triangulate or trilaterate the position of the computing device 102 using distances or angles to cellular network towers with known positions, provided by the communication circuitry 210. In other embodiments, the location circuitry 224 may determine the approximate position of the computing device 102 based on association to wireless networks with known positions, using the communication circuitry 210.

As described previously, the multi-factor authorization module 106 may be located in the computing device 102, the network device 110, or the remote computing device 114. Of course, the network device 110 and/or the remote computing device 114 may include various components similar to the computing device, such as processors, I/O subsystems, memory, data storage, communication circuitry, etc., which are not shown to improve clarity of the description.

Figure 3:
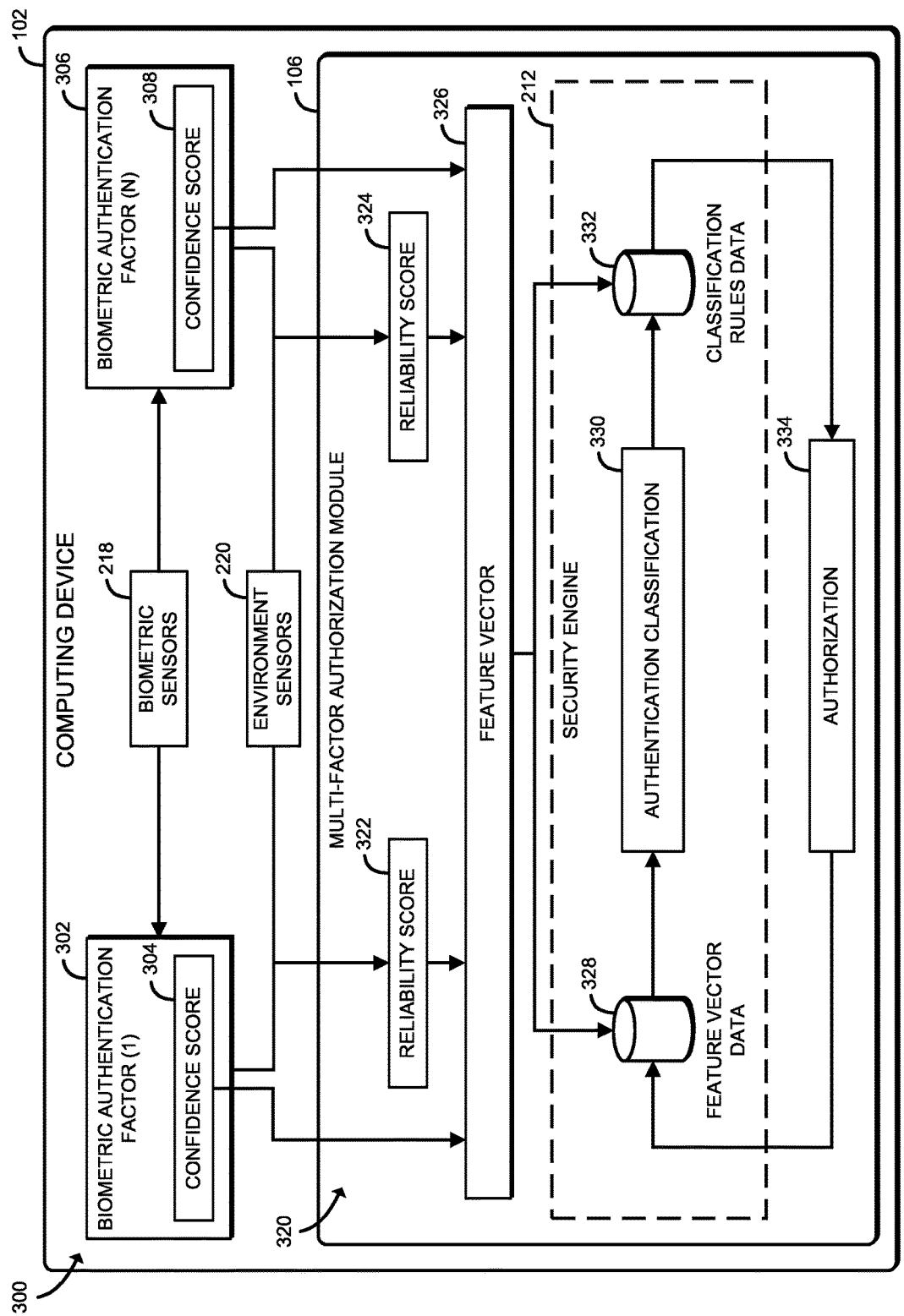
FIG. 3 is a simplified block diagram of at least one embodiment of an environment that may be established by a computing device of FIG. 2.

Referring now to FIG. 3, in an illustrative embodiment, the computing device 102 establishes an environment 300 during operation. In the illustrative environment 300, the computing device 102 has received two or more biometric factors—a first biometric authentication factor, biometric authentication factor (1), is designated as the first biometric authentication factor 302, and a second biometric authentication factor, biometric authentication factor (N), is designated as the second biometric authentication factor 306 (i.e., the "Nth" biometric authentication factor, wherein "N" is a positive integer and designates one or more additional biometric authentication factors).

Each of the first and second biometric authentication factors 302, 306 include a confidence score 304, 308. The confidence scores 304, 308 are typically generated by recognition engines in software and/or hardware specific to the biometric authentication factors being authenticated by the computing device 102. As such, the confidence scores 304, 308 are typically determined from static runtime data collected by the biometric sensors 220 of the computing device 102. Generally, the confidence scores 304, 308 do not provide any contextual reference of the environment 108 during a user's 104 multi-factor authentication attempt. Of course, in some embodiments, the computing device may determine the confidence scores 304, 308 to indicate the probability that the user 104 is an authorized user based on the sensor data received from the corresponding sensor for each the first and second biometric authentication factors 302, 306.

In use, the first biometric authentication factor 302 and the second biometric authentication factor 306 are each different types of biometric authentication functions. For example, in some embodiments, the first biometric authentication factor 302 may be a facial recognition authentication factor and the second biometric authentication factor 306 may be a voice recognition authentication factor. As described previously, the first and second biometric authentication factors 302, 306 may be selected from a number of biometric authentication factors determined using various biometric sensors capable of interpreting physical features of a user 104 including, but not limited to, a fingerprint reader, a retina scanner, a facial recognition scanner, a voice recognition scanner, a heart rate monitor (e.g., thermal imaging sensor, heart rate sensor, or the like), etc. Additionally or alternatively, the biometric authentication factors may include a physical location of the computing device, which may be determined via the location circuitry 224 and/or any known location determining method, such as a wireless fidelity (Wi-Fi) based positioning system (e.g., using radio signal strength identification, or RSSI).

Unlike traditional multi-factor biometric authentication systems, wherein confidence scores 304, 308 may simply be combined together using a predefined formula to determine an authorization decision (i.e., accept or reject), the multi-factor authorization module 106 of the system 100 establishes an environment 320 during operation to weight the reliability of the confidence scores 304, 308. In the illustrative environment 320, the multi-factor authorization module 106 includes a reliability score 322 of the first biometric authentication factor 302 and a reliability score 324 of the second biometric authentication factor 306.

The multi-factor authorization module 106 is configured to assign values corresponding to each physical factor collected to determine a reliability score (i.e., a weight) corresponding to a particular biometric authentication factor being authenticated. For example, in an embodiment wherein the first biometric authentication factor 302 is a facial recognition authentication factor, values may be assigned to a lighting condition, a distance of the user's 104 face from the camera, a tilt of the user's 104 face in various axes, which may be used to weight the reliability (i.e., a reliability score) of the facial recognition authentication factor as a reliable biometric authentication factor. Similarly, for example, in an embodiment wherein the second biometric authentication factor 306 is a voice recognition authentication factor, values may be assigned to a level of background noise and/or a distance of the user 104 from a microphone of the computing device 102 may be assigned values which may be used to weight the reliability (i.e., a reliability score) of the voice recognition authentication factor. In an embodiment where the environment 108 is dark, but quiet, a reliability score determined for a facial recognition authentication factor may be lower than a reliability score determined for the voice recognition authentication factor, due to the poor lighting condition that may interfere with the facial recognition authentication factor and the lack of background noise to interfere with the voice recognition authentication factor. In other words, the voice recognition authentication factor is given more "weight" than the facial recognition authentication factor based on the physical factors of the environment 108 occurring at the time the user 104 attempted to authenticate their identity at the computing device 102.

In some embodiments, the computing device 102 may establish a trusted execution environment in which to perform certain operations (e.g., operations including sensitive data) as described herein. For example, the operations described herein to determine an authentication classification 330 may be performed in a trusted execution environment, such as the security engine 212 of FIG. 2. As will be described in further detail below, the multi-factor authorization module 106 is further configured to generate a feature vector 326. The feature vector 326 includes confidence scores, reliability scores, and behavioral context data (e.g., location, time of day, etc.). The multi-factor authorization module 106 may store the feature vector 326 in a feature vector data 328 and/or a classification rules data 332. Additionally or alternatively, the feature vector data 328 and/or the classification rules data 332 may be stored in a secure environment, such as in the feature vector database 214 and/or the classification rules database 216 of the security engine 212 illustrated in FIG. 2.

Additionally, as described in further detail below, the multi-factor authorization module 106 is configured to determine an authentication classification 330 based on the feature vector 326 and/or classification rules. In use, in some embodiments, the multi-factor authorization module 106 may use a machine learning classification algorithm (i.e., a machine learning classifier) to determine the authentication classification 330. In some embodiments, the machine-learning classifier may be embodied as a support vector machine (SVM) or a logistic regression. In use, described in further detail below, a machine-learning classifier may create a training model by estimating parameters of one or more equations, which the multi-factor authorization module 106 implements as classification rules (i.e., a classification model) based on previously generated feature vectors (i.e., the login pattern) and/or previously determined authentication classifications. The multi-factor authorization module 106 may store the classification rules, the feature vector 326, and/or the login pattern in the classification rules data 332. The classification rules may include a set of parameters to apply to the machine-learning classification algorithm, which may be used by the machine-learning classification algorithm in subsequent authentication attempts. The multi-factor authorization module 106 is additionally configured to determine an authorization 334 (i.e., the result of the user's authentication attempt) based on the classification rules data 332 and/or the feature vector 326, which the computing device 102 may use to determine whether to allow the user 104 access. In some embodiments, the multi-factor authorization module 106 may store the authorization 334 in the feature vector data 328. The authorization 334 may be stored in the feature vector data 328 with an indication of correctness of the feature vector 326 that the authorization 334 resulted from.

Figure 4:
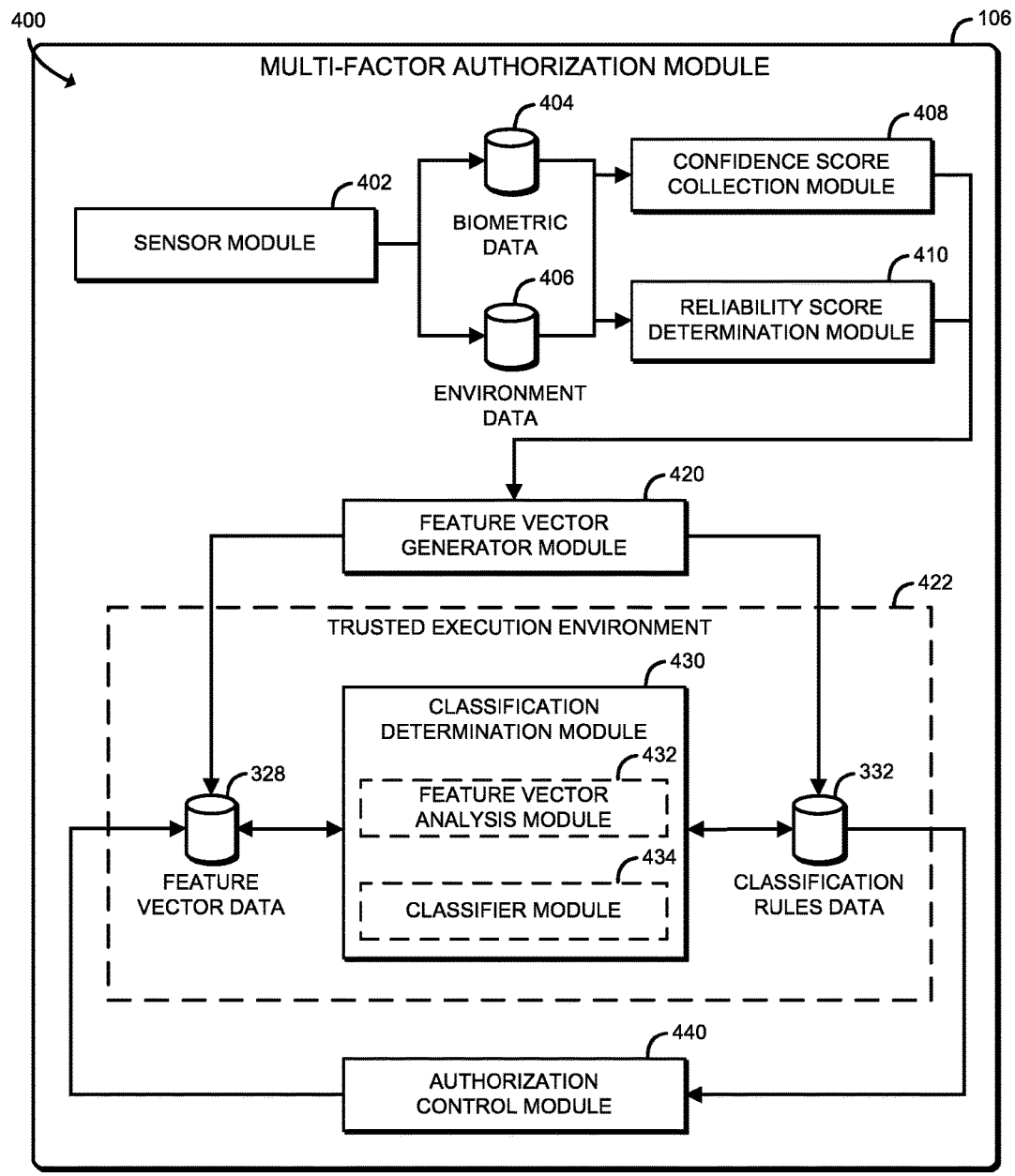
FIG. 4 is a simplified block diagram of at least one embodiment of an environment of a multi-factor authorization module that may be established by the computing device of FIG. 2.

Referring now to FIG. 4, in an illustrative embodiment, the computing device 102 establishes an environment 400 during operation. The illustrative environment 400 includes a sensor module 402, a confidence score collection module 408, a reliability score determination module 410, a feature vector generator module 420, a classification determination module 430, and an authorization control module 440. The various modules of the environment 400 may be embodied as hardware, firmware, software, or a combination thereof. For example the various modules, logic, and other components of the environment 400 may form a portion of, or otherwise be established by, the processor 202 or other hardware components of the computing device 102. As such, in some embodiments, any one or more of the modules of the environment 400 may be embodied as a circuit or collection of electrical devices (e.g., confidence score determination circuit, a reliability score determination circuit, a feature vector generator circuit, etc.).

The sensor module 402 is configured to monitor sensor data received from one or more sensors of the computing device 102. The sensor module 402 may monitor sensor data from "hard" sensors such as the sensors 218 (e.g., biometric sensors 220 and/or environment sensors 222), the location circuitry 224, and/or the communication circuitry 210, or may monitor sensor data from "soft" sensors that derive signals from other sensors or other data sources of the computing device 102. For example, the sensor module 402 may monitor soft behavioral biometric data based on user activity while using the computing device 102, such as heart rate, body temperature, etc.

The illustrative environment 400 of the computing device 102 additionally includes biometric data 404 and environment data 406. The biometric data 404 may include any physical features of a user 104 that may be collected by the sensor module 402 during a multi-factor authentication attempt, such as, a heart rate, a body temperature, etc. The environment data 406 may include any physical factors that may be collected by the sensor module 402 in the environment 108 (i.e., general vicinity) of the user 104 and the computing device 102 during a multi-factor authentication attempt. For example, the environment data 406 may include physical factors, such as a lighting condition, a distance of the user's 104 face from the camera, a tilt of the user's 104 face in various axes, background noise (e.g., ambient noise, multiple voices, etc.), a distance of the user 104 from a microphone of the computing device 102, etc.

The confidence score collection module 408 is configured to collect the confidence scores, which may be determined by recognition engines in software and/or hardware specific to the biometric authentication factors being authenticated by the computing device 102. As described previously, the confidence scores are typically determined from static runtime data collected by the biometric sensors 220 of the computing device 102 and generally do not provide any contextual reference of the environment 108 during a user's 104 multi-factor authentication attempt.

The reliability score determination module 410 is configured to determine a reliability score (e.g., weight) for each biometric authentication factor used by the user 104 during the authentication attempt. The reliability score determination module 410 may determine the reliability score based on certain physical factors collected during the authentication attempt that may impact the reliability of one or more of the biometric authentication factors used during the authentication attempt. For example, a facial recognition authentication factor may be assigned a higher reliability score if the authentication attempt was performed in an environment 108 with bright lighting than if the authentication attempt were performed in an environment 108 with lower lighting. In some embodiments, the reliability score determination module 410 may further refine the reliability score based on contextual data (e.g., location, time of day, etc.) collected during the authentication attempt.

The feature vector generator module 420 is configured to collect the confidence and reliability scores corresponding to each biometric authentication factor used during the authentication attempt, and generate a feature vector (i.e., vector of confidence scores and reliability scores) based on the collected confidence and reliability scores. As described previously, the generated feature vector may be stored in the feature vector data 328 and/or the classification rules data 332.

In some embodiments, the multi-factor authorization module 106 may additionally include a trusted execution environment 422. The trusted execution environment 422 is configured to provide an isolated and secure execution environment within the environment 400. In some embodiments, the trusted execution environment 422 may be embodied as a software-based trusted execution environment; that is, a trusted execution environment that securely executes software using the processor 202 of the computing device 102. For example, the trusted execution environment 422 may be embodied as one or more secure enclaves established using the processor 120, such as a secure enclave established using Intel® SGX technology. Additionally or alternatively, the trusted execution environment 422 may be embodied as a hardware-based trusted execution environment; that is, a trusted execution environment that securely executes independently of software executed by the processor 202. For example, the trusted execution environment 422 may be embodied using a coprocessor, out-of-band processor, or other component of the security engine 212. In some embodiments, the feature vector data 328 and/or the classification rules data 332 may be stored in the trusted execution environment 422.

The classification determination module 430 is configured to determine an authentication classification based on the feature vector generated for the authentication attempt and/or a login pattern. In some embodiments, the classification determination module 430 may include a feature vector analysis module 432 and a classifier module 434. In some embodiments, some or all of the operations performed by the classification determination module 430 may be performed by subsystems of the trusted execution environment 422.

Figure 7:
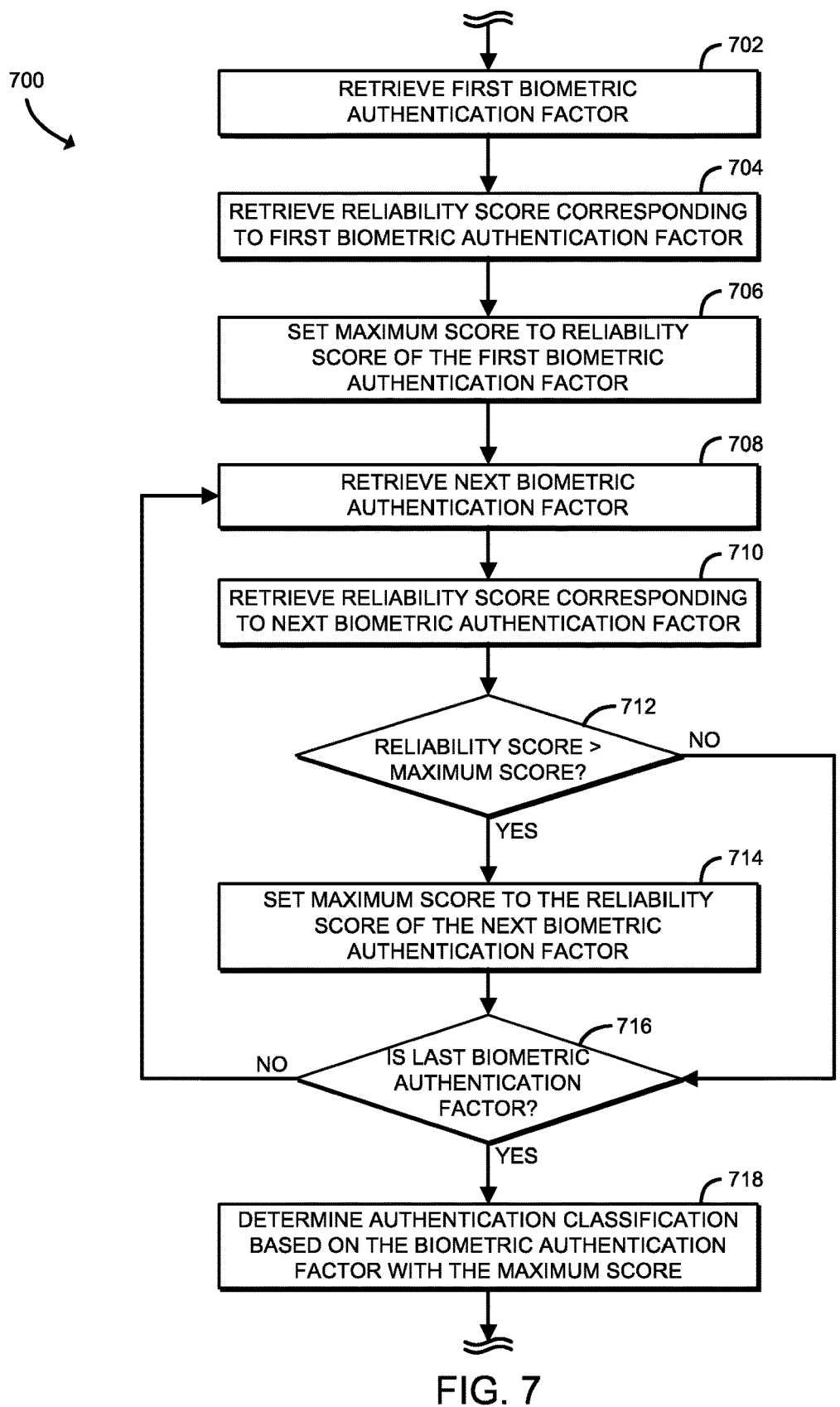
FIG. 7 is a simplified flow diagram of at least one embodiment of a method for multi-factor biometric authentication using feature vector analysis that may be executed by computing device of FIG. 2.
Figure 8:
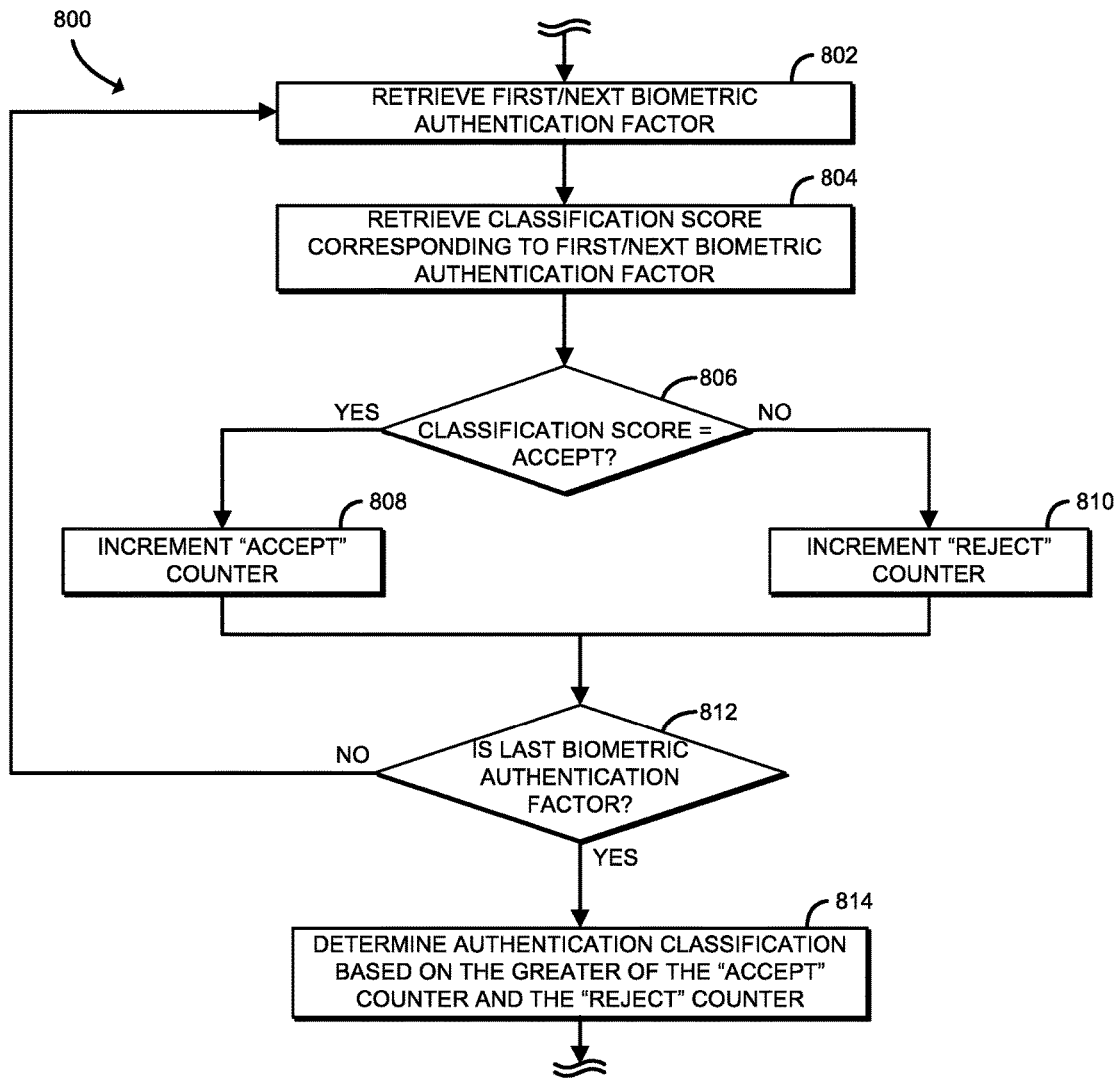
FIG. 8 is a simplified flow diagram of another embodiment of a method for multi-factor biometric authentication using feature vector analysis that may be executed by computing device of FIG. 2.

In use, the classifier module 434 uses a machine-learning classifier to learn classification rules, which may be linear and/or non-linear, based on historical feature vectors (i.e., historical reliability and confidence scores, historical context data, etc.). As such, the classifier module 434 may not be used by the classification determination module 430 to determine the authentication classification until the login pattern has been established. In other words, the classifier module 434 may not have enough data to learn any classification rules and, as such, the classifier module 434 may not be used to determine the authentication classification. In such embodiments, the feature vector analysis module 432 is configured to determine the authentication classification based on the reliability scores and/or the confidence scores. In some embodiments, the feature vector analysis module 432 may determine the authentication classification by selecting the biometric authentication factor with the highest reliability score (i.e., the highest probability of being accurate), as shown in FIG. 7. In other embodiments, the feature vector analysis module 432 may determine the authentication classification by a majority rule, as shown in FIG. 8. In still other embodiments, the feature vector analysis module 432 may determine the authentication classification using a combination of the highest reliability score and the majority rule, such as wherein a tie-breaker is needed in an embodiment relying initially on the majority rule.

Figure 6:
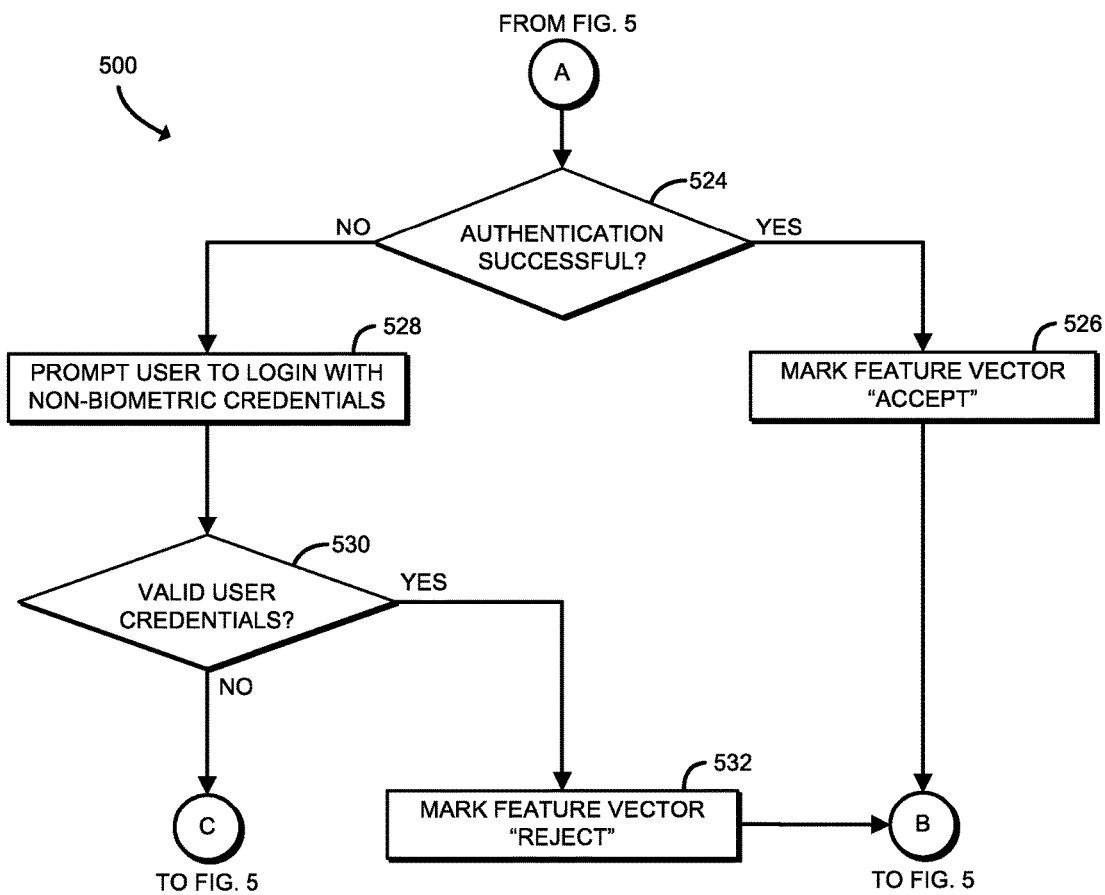
FIG. 6 is a simplified flow diagram of at least one embodiment of a method for verifying a result of the multi-factor biometric authentication via a non-biometric input that may be executed by a computing device of FIG. 2.

Additionally, the feature vector analysis module 432 is configured to mark the feature vector with an indication of correctness to indicate that the feature vector was either accepted or rejected based on the authentication classification determined by the feature vector analysis module 432. For example, if the authentication attempt was successful (i.e., the authentication classification determined to accept the authentication attempt), the feature vector analysis module 432 may mark the feature vector with an indication of correctness to indicate that the feature vector is accepted (i.e., the authentication classification was correct). Otherwise, the feature vector analysis module 432 may prompt the user 104 to provide a non-biometric input, such as text-based credentials (e.g., username, password, passphrase, PIN, etc.), to verify the authentication classification, as shown in FIG. 6. If the non-biometric input is determined to be valid (i.e., authenticates the user 104), the feature vector analysis module 432 may mark the feature vector with an indication to indicate that the feature vector is rejected (i.e., the authentication classification was incorrect and the user 104 should have been authenticated, or a false negative).

The classifier module 434 may determine the login pattern based on the feature vectors associated with a series of biometric authentications performed by the user 104 over a period of time. The feature vectors and corresponding indications may be used by the classifier module 434 to determine the login pattern, which the machine-learning classifier may then use to create the classification rules. In other words, the authentication classifications and the indications, determined by the feature vector analysis module 432 and the feature vectors used by the feature vector analysis module 432 to determine the authentication classifications may provide sufficient data over the period of time necessary for classifier module 434 to determine the login pattern.

For example, a user 104 may attempt to authenticate themselves at a computing device 102 at a business office on weekdays and at a home office on weekends. In an embodiment wherein the computing device 102 requires a facial recognition authentication factor and a voice recognition authentication factor to authenticate the user 104, the business office may be louder with better lighting than the home office, which may be quieter, but offer poor lighting. In such an embodiment, applying historically verified authentication attempts to a present authentication attempt by the user (i.e., using hysteresis), the login pattern may indicate that the facial recognition authentication factor may be more reliable (i.e., weighted toward) to authenticate the user 104 on the weekdays and the voice recognition authentication factor may be more reliable (i.e., weighted toward) to authenticate the user 104 on the weekends. In other words, the login pattern may indicate to weight one biometric authentication factor over another biometric authentication factor, depending on which day and/or what time of day the authentication was attempted.

After the login pattern has matured, the classification determination module 430 uses the classifier module 434 to determine the authentication classifications. In other words, after a sufficient number of authentication classifications and feature vector indications have been determined, the machine-learning classifier may then use the login pattern to create the classification rules. In some embodiments, the login pattern may be mature only after a minimum number of verified authentication classifications (i.e., samples) have been determined. In use, the classifier module 434 uses the classification rules to determine an authentication classification upon receiving a generated feature vector. In other words, the classifier module 434 may use the classification rules to determine whether to accept (i.e., authorize) or reject (i.e., not authorize) the user's 104 multi-factor authentication attempt in response to receiving the generated feature vector.

Of course, the login pattern may continue to be adjusted over time, based on subsequent authentication attempts. For example, the login pattern may be updated after every multi-factor authentication attempt or after a predetermined number of authentication attempts. As such, the classification rules may be learned and refined incrementally over time based on the adjusted login pattern. In other words, the login pattern may have been stored and refined in previous invocations of the machine-learning classifier, and thus, the classification rules resulting therefrom may be adapted to changes in the user's 104 behavior. In some embodiments, the computing device 102 applies the machine-learning classifier within the trusted execution environment 422.

The authorization control module 440 is configured to perform an authorization action based on the authentication classification. The authorization action may be any security operation of the computing device 102. For example, the authorization action may allow the user 104 limited access to the computing device 102 (e.g., limit access to a file, a folder, a drive, etc.), allow the user 104 unfettered access to the computing device 102, or deny the user 104 any access to the computing device 102. The authorization control module 440 may perform an authorization action based on the authentication classification and/or additional collected data, depending on whether the feature vector analysis module 432 or the classifier module 434 determined the authentication classification. For example, if the classifier module 434 determined the authentication classification (i.e., the classification rules were created and mature), the authorization control module 440 may perform the authorization action based solely on the authentication classification. In other words, if the classifier module 434 provides an authentication classification that indicates the authorization attempt was successful, the authorization action may be to allow the user 104 access without checking other data to authenticate the user 104. However, if the feature vector analysis module 432 determined the authentication classification (i.e., the classification rules were not yet created or have not yet matured), the authorization control module 440 may check the indication of the feature vector corresponding to the authentication classification before performing the authorization action. For example, if the feature vector analysis module 432 provides an authentication classification that indicates the authorization attempt was not successful, but the indication indicates the user 104 is an authorized user, the authorization action may be to allow the user 104 access. In some embodiments, the authorization control module 440 may further provide an indication to the computing device 102 to notify the user 104 of the authorization action.

Figure 5:
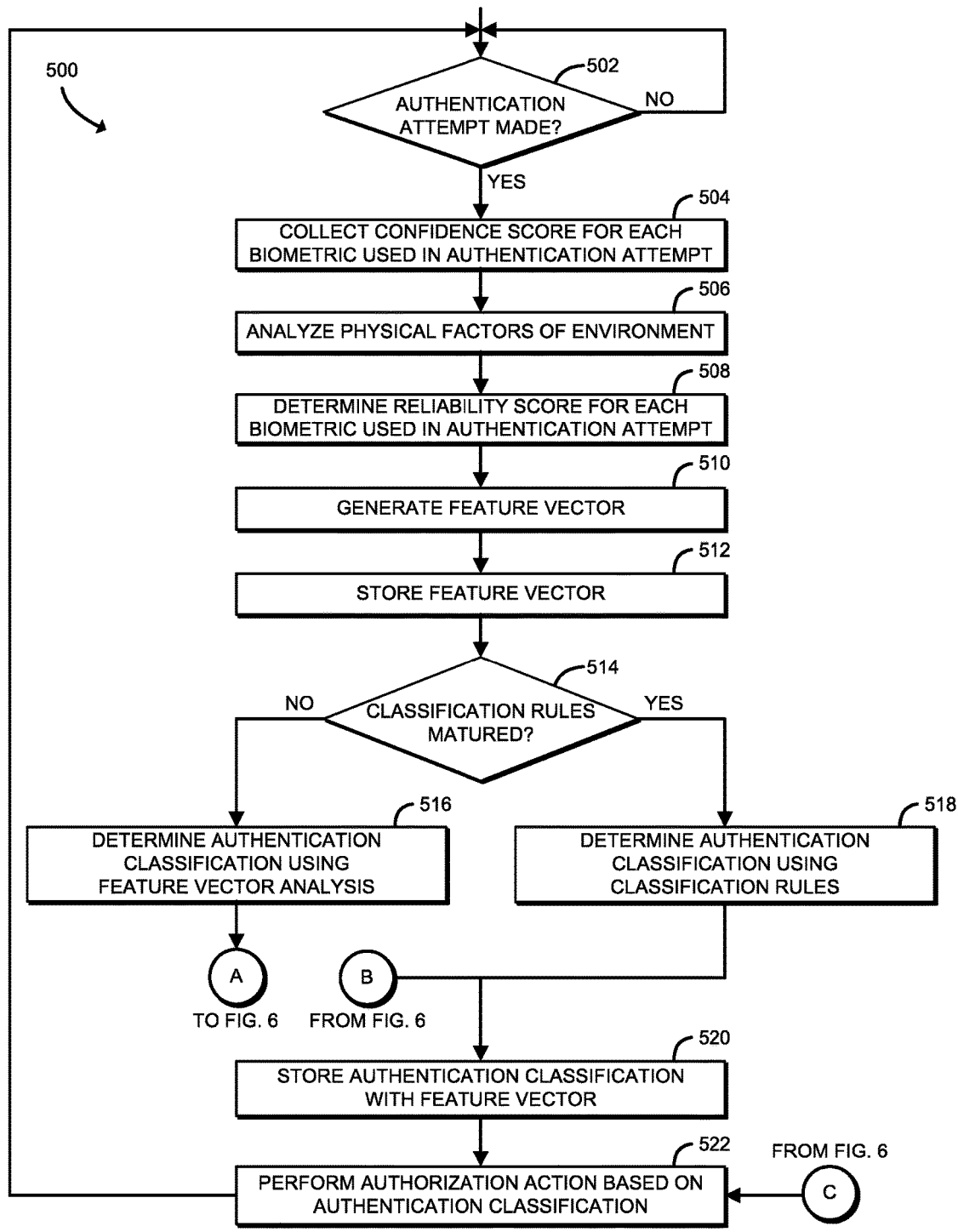
FIG. 5 is a simplified flow diagram of at least one embodiment of a method for multi-factor biometric authentication that may be executed by a computing device of FIG. 2.

Referring now to FIG. 5, in use, the multi-factor authorization module 106 of the computing device 102 may execute a method 500 for authenticating a user in a multi-factor authentication system, such as the system 100. The method 500 begins with block 502, in which the multi-factor authorization module 106 determines whether a multi-factor authentication attempt was made by a user 104. In some embodiments, the computing device 102 may initiate the authentication process in response to a user command or other user input event. For example, the computing device 102 may authenticate the user in response to a request to login or otherwise access the computing device 102, a request to access data or decrypt encrypted files on the computing device 102, or a request for payment or other financial transaction (e.g., a request to withdraw funds from an ATM). In some embodiments, the computing device 102 may initiate the authentication process automatically upon detecting the user 104 at the computing device 102. If the multi-factor authorization module 106 determines the multi-factor authentication attempt was made by a user 104, the method 500 advances to block 504, otherwise the method 500 loops back to block 502 to continue to determine whether a multi-factor authentication attempt was made by a user 104.

In block 504, the multi-factor authorization module 106 collects the confidence scores for each biometric used in the multi-factor authentication attempt. As described previously, the confidence scores are typically produced by hardware and/or software specific to a particular biometric authentication factor, the output of which may be collected by the multi-factor authorization module 106. In some embodiments, the output may be collected by the multi-factor authorization module 106 using an application programming interface (API) provided by a vendor of the sensor used for the particular biometric authentication factor. In block 506, the computing device analyzes physical factors of the environment 108. The physical factors may include any type of physical factors of the environment 108 (e.g., lighting condition, distance of the user 104 from the biometric sensor, audible background noise, etc.) capable of being collected by the computing device 102 during a multi-factor authentication attempt. In some embodiments, the physical factors may additionally include physical features of the user 104 (e.g., a heart rate, a body temperature, etc.) capable of being collected by the computing device 102 during a multi-factor authentication attempt.

In block 508, the multi-factor authorization module 106 determines a reliability score for each biometric authentication factor used in the multi-factor authentication attempt. Depending on which biometric authentication factors are being used, the reliability scores may be based on physical factors of the environment 108 (e.g., luminance, background noise, etc.) during the authentication attempt. For example, the reliability of a voice recognition authentication factor is generally dependent on a level of background noise, a presence of multiple human voices, a distance of the user 104 from a microphone of the computing device 102, and the like. Additionally, the confidence score of the voice recognition authentication factor is typically in the form of a binary result (e.g., accept/reject), and as such may not take into account such dependencies. The multi-factor authorization module 106 may determine a reliability score (i.e., a weight) for the voice recognition authentication factor based on reliability values assigned to each of the dependencies. For example, a user 104 attempting to authenticate may be located in an enclosed office with little to no noise and no additional people in the office; however, the user 104 attempting to authenticate may be standing several feet away from the computing device 102. As such, the reliability values corresponding to each of the level of background noise and the presence of multiple human voices dependencies may be assigned a higher reliability value than the distance of the user 104 from a microphone of the computing device 102 dependency. Therefore, each reliability value assigned to each dependency may be used to determine the reliability score, or weight, to be assigned to the voice recognition authentication factor. Of course, in some embodiments, additional and/or alternative dependencies may be used to determine a reliability score for a voice recognition authentication factor. In some embodiments, the reliability score may be additionally or alternatively based on contextual data (e.g., location, time of day, etc.) collected during the authentication attempt.

In block 510, the multi-factor authorization module 106 generates a feature vector that includes confidence scores, reliability scores, and any behavioral context data associated with each biometric authentication factor and/or the multi-factor authentication attempt. In block 512, the generated feature vector is stored in a database of the computing device 102, which may be a secure database, such as the feature vector database 214 of the security engine 212 as shown in FIG. 2. In block 514, the multi-factor authorization module 106 determines whether the classification rules have matured. As described previously, until a predetermined number of authentication classifications have been performed and verified, the classification rules needed by the multi-factor authorization module 106 to determine the authentication classification for the present multi-factor authentication attempt may not yet be created, or may not yet have matured to the point they can be used. If the multi-factor authorization module 106 determines the classification rules have not matured (i.e., a predetermined number of authentication classifications have not been performed and verified), the method 500 advances to block 516 to determine the authentication classification using a feature vector analysis, examples of which are described in further detail below in FIGS. 7 and 8. In use, as noted previously, the authentication classification and feature vector used to determine the authentication classification using the feature vector analysis are used by the multi-factor authorization module 106 to determine the login pattern, which is used to train the classification algorithm and create the classification rules. If the multi-factor authorization module 106 determines the classification rules have matured (i.e., a predetermined number of authentication classifications have been performed and verified), the method 500 advances to block 518 to determine the authentication classification.

In block 518, the multi-factor authorization module 106 determines the authentication classification using the classification rules. As described previously, a machine-learning classifier, such as a support vector machine (SVM) or a logistic regression, for example, may be used by the multi-factor authorization module 106 to create a training model, or set of parameters, to create the classification rules for which to apply the classification algorithm. The classification rules may be based on historical data (i.e., the login pattern) to determine which biometric authentication factors may be more reliable based on certain context data, such as the location and time of day in which the multi-factor authentication is being attempted. In some embodiments, the authentication using the classification rules may be determined in the trusted execution environment 422. The computing device 102 may use any appropriate technique to initialize the trusted execution environment 422. For example, the computing device 102 may establish one or more secure enclaves within the memory 206 using the processor 202. To establish a secure enclave, the computing device 102 may execute one or more processor instructions to create the secure enclave, add memory pages to the secure enclave, and finalize measurements of the secure enclave. The secure enclave may be established, for example, using Intel® SGX technology. Additionally or alternatively, the computing device 102 may initialize the trusted execution environment 422 using a coprocessor, out-of-band processor, or other component of the security engine 212. For example, in some embodiments, the computing device 102 may generate a network request, local socket connection, HECI bus message, or other message to the security engine 212 to initialize the trusted execution environment 422. After being initialized, any of the remaining processes of the method 500 may execute from within the trusted execution environment 422.

Subsequent to the multi-factor authorization module 106 determining the authentication classification in block 518, the method 500 advances to block 520 to store the authentication classification with the feature vector generated in block 510. As noted previously, the multi-factor authorization module 106 may further refine the classification rules based on the authentication classification stored in block 520 and the feature vector generated in block 510. In block 522, the multi-factor authorization module 106 performs an authorization action based on the authentication classification. For example, if the authentication classification corresponds to a successful authentication, the multi-factor authorization module 106 may allow the user 104 access to at least a portion of the computing device 102. However, if the authentication classification corresponds to an unsuccessful authentication, the multi-factor authorization module 106 may deny the user 104 access to at least a portion of the computing device 102.

Referring back to block 516, subsequent to the multi-factor authorization module 106 determining the authentication classification in block 516, the multi-factor authorization module 106 determines whether the authentication was successful in block 524, which is illustrated in FIG. 6. If the authentication was successful, the multi-factor authorization module 106 marks the feature vector with an "accept" indication to indicate that the authentication classification was correct in block 526 before the method 500 advances to block 520 to store the authentication classification with the feature vector generated in block 510. If the authentication was not successful, the multi-factor authorization module 106 prompts the user 104 to login via a non-biometric input, such as text-based credentials (e.g., username, password, passphrase, PIN, etc.) in block 528. In block 530, the multi-factor authorization module 106 determines whether the user's 104 login credentials are valid. If the user's 104 login credentials are determined to be valid, the method 500 advances to block 532. In block 532, the multi-factor authorization module 106 marks the feature vector with a "reject" indication to indicate that the authentication classification was incorrect, or a false negative, before the method advances to block 520 to store the authentication classification with the feature vector generated in block 510. If the user's 104 login credentials are determined to be invalid, the method 500 advances to block 522, wherein, as noted previously, the multi-factor authorization module 106 performs an authorization action.

Referring now to FIG. 7, in use, the multi-factor authorization module 106 of the computing device 102 may execute a method 700 for multi-factor biometric authentication using feature vector analysis (as shown in block 516 of FIG. 5). The method 700 begins with block 702, in which the multi-factor authorization module 106 retrieves the first biometric authentication factor. In block 704, the multi-factor authorization module 106 retrieves the reliability score that corresponds to the first biometric authentication factor. In block 706, the multi-factor authorization module 106 sets a maximum score to the reliability score of the first biometric authentication factor. In block 708, the multi-factor authorization module 106 retrieves the next biometric authentication factor. In block 710, the multi-factor authorization module 106 retrieves the reliability score that corresponds to the next biometric authentication factor. In block 712, the multi-factor authorization module 106 determines whether the reliability score corresponding to the next biometric authentication factor retrieved in block 710 is greater than the maximum score. If the reliability score is greater than the maximum score, the method 700 advances to block 714, wherein the multi-factor authorization module 106 sets the maximum score to the reliability score of the next biometric authentication factor.

If the reliability score is determine not to be greater than the maximum score in block 712, or the maximum score was set to the reliability score of the next biometric authentication factor in block 714, the method 700 advances to block 716. In block 716, the multi-factor authorization module 106 determines whether the next biometric authentication factor retrieved in block 708 is the last biometric authentication factor used in the multi-factor authentication. If not, the method 700 loops back to block 708 to retrieve the next biometric authentication factor; otherwise, the method advances to block 718 to determine an authentication classification based on the biometric authentication factor that corresponds to the maximum score.

Referring now to FIG. 8, in use, the multi-factor authorization module 106 of the computing device 102 may execute a method 800 for multi-factor biometric authentication using feature vector analysis (as shown in block 516 of FIG. 5). The method 800 begins with block 802, in which the multi-factor authorization module 106 retrieves the first biometric authentication factor. In block 804, the multi-factor authorization module 106 retrieves the confidence score that corresponds to the first biometric authentication factor. In block 806, the multi-factor authorization module 106 determines whether the confidence score corresponds to an accepted biometric authentication factor. If so, the method 800 advances to block 808, wherein the multi-factor authorization module 106 increments an "accept" counter. If not (i.e., the confidence score corresponds to a rejected biometric authentication factor), the method 800 advances to block 810, wherein the multi-factor authorization module 106 increments a "reject" counter. Subsequent to either counter being incremented in block 808 or 810, the method 800 advances to block 812 to determine whether the biometric authentication factor most recently retrieved is the last biometric authentication factor used in the multi-factor authentication. If not, the method 800 loops back to block 802 to retrieve the next biometric authentication factor. If so, the method 800 determines the authentication classification based on which of the "accept" and "reject" counters is greater in value.

Of course, it should be appreciated that in some embodiments, a combination of the illustrative feature vector analysis methods 700, 800 may be used in any particular order. For example, if the method 700 using the reliability scores results in the method 800 using the majority rule may be used. In another example, if the method 800 using the majority rule results in the "accept" and "reject" counters being equal, the method 700 using the reliability scores may be used to break the tie. It should be further appreciated that an alternative feature vector analysis method may be used in the multi-factor authentication.

EXAMPLES

Illustrative examples of the technologies disclosed herein are provided below. An embodiment of the technologies may include any one or more, and any combination of, the examples described below.

Example 1 includes a computing device for a multi-factor authentication of a user, the computing device comprising a plurality of sensors to collect sensor data related to the user and an environment of the computing device; a reliability score determination module to determine a reliability score for each of a plurality of biometric authentication factors submitted by the user based on the sensor data, the reliability score indicative of a weight applied to a biometric authentication factor that corresponds to the reliability score; a feature vector generator module to generate a feature vector that includes the reliability score and a confidence score for each biometric authentication factor, the confidence score indicative of a likelihood of authentication of the biometric authentication factor; a classification determination module to determine an authentication classification based on the feature vector, wherein the authentication classification is determined based on classification rules in response to a determination that the classification rules have matured; and an authorization control module to perform an authorization action based on the authentication classification.

Example 2 includes the subject matter of Example 1, and further including a classifier module to determine a login pattern based on a plurality of previous multi-factor authentications, and to generate the classification rules via a machine-learning classifier based on the login pattern.

Example 3 includes the subject matter of any of Examples 1 and 2, and wherein the machine-learning classifier comprises one of a machine-learning classification algorithm, a support vector machine (SVM) or a logistic regression.

Example 4 includes the subject matter of any of Examples 1-3, and wherein the classification determination module determines the login pattern and the authentication classification in a secure environment of the computing device.

Example 5 includes the subject matter of any of Examples 1-4, and wherein to determine the reliability score for each of the plurality of biometric authentication factors used in the multi-factor authentication comprises to analyze the sensor data from the plurality of sensors; and determine the reliability score for each of the plurality of biometric authentication factors based on one or more physical factors of the environment of the computing device during the multi-factor authentication.

Example 6 includes the subject matter of any of Examples 1-5, and wherein the one or more physical factors of the environment comprises data collected via one or more sensors of the computing device, and wherein the data impacts a reliability of one or more of the plurality of biometric authentication factors.

Example 7 includes the subject matter of any of Examples 1-6, and further including a confidence score collection module to collect the confidence score for each of the plurality of biometric authentication factors.

Example 8 includes the subject matter of any of Examples 1-7, and wherein to determine the authentication classification based on the feature vector comprises to: (i) perform a feature vector analysis on the feature vector, (ii) determine the authentication classification based on the feature vector analysis, and (iii) mark the feature vector with an indication of correctness of the authentication classification.

Example 9 includes the subject matter of any of Examples 1-8, and wherein to perform the feature vector analysis on the feature vector comprises to compare each reliability score of each of the plurality of biometric authentication factors, and wherein to determine the authentication classification based on the feature vector analysis comprises to determine the authentication classification based on a selection of the biometric authentication factor with a reliability score greater than the other biometric authentication factors.

Example 10 includes the subject matter of any of Examples 1-9, and wherein to perform the feature vector analysis on the feature vector comprises to determine whether the confidence score for each biometric authentication factor corresponds to an accepted biometric authentication factor or a rejected biometric authentication factor, and wherein to determine the authentication classification based on the feature vector analysis comprises to determine the authentication classification based on the greater of a first total of the accepted biometric authentication factors and a second total of the rejected biometric authentication factors.

Example 11 includes the subject matter of any of Examples 1-10, and wherein to mark the feature vector with the indication of correctness of the authentication classification comprises to verify the feature vector based on a non-biometric input from the user in response to a determination that the authentication classification indicates an unsuccessful authentication and mark the feature vector with a rejected indication in response to a determination that the non-biometric input is valid.

Example 12 includes the subject matter of any of Examples 1-11, and wherein to verify the feature vector based on the non-biometric input from the user comprises to verify the feature vector based on a text-based input from the user.

Example 13 includes the subject matter of any of Examples 1-12, and wherein the determination that the classification rules have matured is based on a predetermined number of feature vectors that have been verified.

Example 14 includes the subject matter of any of Examples 1-13, and wherein to mark the feature vector with the indication of correctness of the authentication classification comprises to mark the feature vector with an accepted indication in response to a determination that the authentication classification indicates a successful authentication.

Example 15 includes the subject matter of any of Examples 1-14, and wherein to perform the authorization action comprises to allow access to the user to at least a portion of the computing device in response to a determination that the authentication classification indicates a successful authentication, or deny access to the user to at least a portion of the computing device in response to a determination that the authentication classification indicates an unsuccessful authentication.

Example 16 includes a method for authenticating a user of a multi-factor authentication including a computing device, the method comprising collecting, by the computing device, sensor data related to the user and an environment of the computing device from a plurality of sensors of the computing device; determining, by the computing device, a reliability score for each of a plurality of biometric authentication factors submitted by the user based on the sensor data, the reliability score indicating a weight applied to the corresponding biometric authentication factor; generating, by the computing device, a feature vector that includes the reliability score and a confidence score for each biometric authentication factor, the confidence score indicating a likelihood of authentication of the biometric authentication factor; determining, by the computing device, whether one or more classification rules have matured; determining, by the computing device, an authentication classification based on the feature vector, wherein determining the authentication classification is further based on the classification rules in response to determining the classification rules have matured; and performing, by the computing device, an authorization action based on the authentication classification.

Example 17 includes the subject matter of Example 16, and further including determining, by the computing device, a login pattern based on a plurality of previous multi-factor authentications; and generating, by the computing device, the classification rules via a machine-learning classifier based on the login pattern.

Example 18 includes the subject matter of any of Examples 16 and 17, and wherein generating the classification rules via the machine-learning classifier comprises generating the classification rules via one of a machine-learning classification algorithm, a support vector machine (SVM) or a logistic regression.

Example 19 includes the subject matter of any of Examples 16-18, and wherein determining the authentication classification comprises determining the authentication classification in a secure environment of the computing device, and wherein determining the login pattern comprises determining the login pattern in the secure environment of the computing device.

Example 20 includes the subject matter of any of Examples 16-19, and wherein determining the reliability score for each of the plurality of biometric authentication factors used in the multi-factor authentication comprises analyzing the sensor data from the plurality of sensors and determining the reliability score for each of the plurality of biometric authentication factors based on one or more physical factors of the environment of the computing device during the multi-factor authentication.

Example 21 includes the subject matter of any of Examples 16-20, and wherein determining the reliability score for each of the plurality of biometric authentication factors based on the one or more physical factors of the environment comprises collecting data of the environment that impacts a reliability of one or more of the plurality of biometric authentication factors via one or more sensors of the computing device.

Example 22 includes the subject matter of any of Examples 16-21, and further including collecting, by the computing device, the confidence score for each of the plurality of biometric authentication factors.

Example 23 includes the subject matter of any of Examples 16-22, and wherein determining the authentication classification based on the feature vector comprises: (i) performing a feature vector analysis on the feature vector, (ii) determining the authentication classification based on the feature vector analysis, and (iii) marking the feature vector with an indication of correctness of the authentication classification.

Example 24 includes the subject matter of any of Examples 16-23, and wherein performing the feature vector analysis on the feature vector comprises comparing each reliability score of each of the plurality of biometric authentication factors, and wherein determining the authentication classification based on the feature vector analysis comprises determining the authentication classification based on a selection of the biometric authentication factor with a reliability score greater than the other biometric authentication factors.

Example 25 includes the subject matter of any of Examples 16-24, and wherein performing the feature vector analysis on the feature vector comprises determining whether the confidence score for each biometric authentication factor corresponds to an accepted biometric authentication factor or a rejected biometric authentication factor, and wherein determining the authentication classification based on the feature vector analysis comprises determining the authentication classification based on the greater of a first total of the accepted biometric authentication factors and a second total of the rejected biometric authentication factors.

Example 26 includes the subject matter of any of Examples 16-25, and wherein marking the feature vector with the indication of correctness of the authentication classification comprises verifying the feature vector based on a non-biometric input from the user in response to the authentication classification indicating an unsuccessful authentication and marking the feature vector with a rejected indication in response to determining the non-biometric input is valid.

Example 27 includes the subject matter of any of Examples 16-26, and wherein verifying the feature vector based on the non-biometric input from the user comprises verifying the feature vector based on a text-based input from the user.

Example 28 includes the subject matter of any of Examples 16-27, and wherein determining the classification rules have matured comprises determining the classification rules have matured based on a predetermined number of feature vectors having been verified.

Example 29 includes the subject matter of any of Examples 16-28, and wherein marking the feature vector with the indication of correctness of the authentication classification comprises marking the feature vector with an accepted indication in response to the authentication classification indicating a successful authentication.

Example 30 includes the subject matter of any of Examples 16-29, and wherein performing the authorization action comprises allowing access to the user to at least a portion of the computing device in response to the authentication classification indicating a successful authentication, or denying access to the user to at least a portion of the computing device in response to the authentication classification indicating an unsuccessful authentication.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Example 16-30.

Example 33 includes a computing device for authenticating a user of a multi-factor authentication including a computing device, the computing device comprising means for collecting sensor data related to the user and an environment of the computing device from a plurality of sensors of the computing device; means for determining a reliability score for each of a plurality of biometric authentication factors submitted by the user based on the sensor data, the reliability score indicating a weight applied to the corresponding biometric authentication factor; means for generating a feature vector that includes the reliability score and a confidence score for each biometric authentication factor, the confidence score indicating a likelihood of authentication of the biometric authentication factor; means for determining whether one or more classification rules have matured; means for determining an authentication classification based on the feature vector, wherein determining the authentication classification is further based on the classification rules in response to determining the classification rules have matured; and means for performing an authorization action based on the authentication classification.

Example 34 includes the subject matter of Example 33, and further including means for determining a login pattern based on a plurality of previous multi-factor authentications; and means for generating the classification rules via a machine-learning classifier based on the login pattern.

Example 35 includes the subject matter of any of Examples 33 and 34, and wherein the means for generating the classification rules via the machine-learning classifier comprises means for generating the classification rules via one of a machine-learning classification algorithm, a support vector machine (SVM) or a logistic regression.

Example 36 includes the subject matter of any of Examples 33-35, and wherein the means for determining the authentication classification comprises means for determining the authentication classification in a secure environment of the computing device, and wherein the means for determining the login pattern comprises means for determining the login pattern in the secure environment of the computing device.

Example 37 includes the subject matter of any of Examples 33-36, and wherein the means for determining the reliability score for each of the plurality of biometric authentication factors used in the multi-factor authentication comprises means for analyzing the sensor data from the plurality of sensors and means for determining the reliability score for each of the plurality of biometric authentication factors based on one or more physical factors of the environment of the computing device during the multi-factor authentication.

Example 38 includes the subject matter of any of Examples 33-37, and wherein the means for determining the reliability score for each of the plurality of biometric authentication factors based on the one or more physical factors of the environment comprises means for collecting data of the environment that impacts a reliability of one or more of the plurality of biometric authentication factors via one or more sensors of the computing device.

Example 39 includes the subject matter of any of Examples 33-38, and further including means for collecting the confidence score for each of the plurality of biometric authentication factors.

Example 40 includes the subject matter of any of Examples 33-39, and wherein the means for determining the authentication classification based on the feature vector comprises: (i) means for performing a feature vector analysis on the feature vector, (ii) means for determining the authentication classification based on the feature vector analysis, and (iii) means for marking the feature vector with an indication of correctness of the authentication classification.

Example 41 includes the subject matter of any of Examples 33-40, and wherein the means for performing the feature vector analysis on the feature vector comprises means for comparing each reliability score of each of the plurality of biometric authentication factors, and wherein the means for determining the authentication classification based on the feature vector analysis comprises means for determining the authentication classification based on a selection of the biometric authentication factor with a reliability score greater than the other biometric authentication factors.

Example 42 includes the subject matter of any of Examples 33-41, and wherein the means for performing the feature vector analysis on the feature vector comprises means for determining whether the confidence score for each biometric authentication factor corresponds to an accepted biometric authentication factor or a rejected biometric authentication factor, and wherein the means for determining the authentication classification based on the feature vector analysis comprises means for determining the authentication classification based on the greater of a first total of the accepted biometric authentication factors and a second total of the rejected biometric authentication factors.

Example 43 includes the subject matter of any of Examples 33-42, and wherein the means for marking the feature vector with the indication of correctness of the authentication classification comprises means for verifying the feature vector based on a non-biometric input from the user in response to the authentication classification indicating an unsuccessful authentication, and means for marking the feature vector with a rejected indication in response to determining the non-biometric input is valid.

Example 44 includes the subject matter of any of Examples 33-43, and wherein the means for verifying the feature vector based on the non-biometric input from the user comprises means for verifying the feature vector based on a text-based input from the user.

Example 45 includes the subject matter of any of Examples 33-44, and wherein the means for means for determining the classification rules have matured comprises means for determining the classification rules have matured based on a predetermined number of feature vectors having been verified.

Example 46 includes the subject matter of any of Examples 33-45, and wherein the means for marking the feature vector with the indication of correctness of the authentication classification comprises means for marking the feature vector with an accepted indication in response to the authentication classification indicating a successful authentication.

Example 47 includes the subject matter of any of Examples 33-46, and wherein the means for performing the authorization action comprises means for allowing access to the user to at least a portion of the computing device in response to the authentication classification indicating a successful authentication, or means for denying access to the user to at least a portion of the computing device in response to the authentication classification indicating an unsuccessful authentication.

The invention claimed is:

1. A computing device for a multi-factor authentication of a user, the computing device comprising:
    a plurality of sensors to collect sensor data related to the user and an environment of the computing device;
    a reliability score determination module to determine a reliability score for each of a plurality of biometric authentication factors submitted by the user based on the sensor data, the reliability score indicative of a weight applied to a biometric authentication factor that corresponds to the reliability score;
    a feature vector generator module to generate a feature vector that includes the reliability score and a confidence score for each biometric authentication factor, the confidence score indicative of a likelihood of authentication of the biometric authentication factor;
    a classification determination module to determine a historical login pattern associated with the user, wherein the historical login pattern is representative of historical login attempts by the user in different environments, compare a present time when the biometric authentication factors were submitted by the user to the historical login pattern to determine a present environment of the user at the present time, match the present environment with one or more login attempts in the historical login pattern, determine an authentication result for each of the one or more matched login attempts in the historical login pattern associated with the present environment, selectively increase or decrease, in response to a determination that the present environment matches an environment of a login attempt in the historical login pattern, a weight associated with one or more of the confidence scores in the feature vector as a function of the determination of the authentication results of the one or more matched login attempts associated with the present environment, and determine an authentication classification as a function of the feature vector including marking the feature vector with an indication of correctness of the authentication classification;
    a classifier module to produce, as a function of the indication of correctness, a classification rule that defines an amount by which one or more of the weights is to be adjusted in a subsequent login attempt; and
    an authorization control module to perform an authorization action based on the authentication classification.

2. The computing device of claim 1,
    wherein to produce the classification rules comprises to produce the classification rules with a machine-learning classifier based on the historical login pattern.

3. The computing device of claim 1, wherein to determine the reliability score for each of the plurality of biometric authentication factors used in the multi-factor authentication comprises to:
analyze the sensor data from the plurality of sensors; and
determine the reliability score for each of the plurality of biometric authentication factors based on one or more physical factors of the environment of the computing device during the multi-factor authentication,
wherein the one or more physical factors of the environment comprises data collected via one or more sensors of the computing device, and wherein the data impacts a reliability of one or more of the plurality of biometric authentication factors.

4. The computing device of claim 1, wherein to determine the authentication classification based on the feature vector comprises to: (i) perform a feature vector analysis on the feature vector and (ii) determine the authentication classification based on the feature vector analysis.

5. The computing device of claim 1, wherein to perform the authorization action comprises to allow access to the user to at least a portion of the computing device in response to a determination that the authentication classification indicates a successful authentication, or deny access to the user to at least a portion of the computing device in response to a determination that the authentication classification indicates an unsuccessful authentication.

6. The computing device of claim 2, wherein the classification determination module is to determine the historical login pattern and the authentication classification in a secure environment of the computing device.

7. The computing device of claim 4, wherein to mark the feature vector with the indication of correctness of the authentication classification comprises to verify the feature vector based on a non-biometric input from the user in response to a determination that the authentication classification indicates an unsuccessful authentication and mark the feature vector with a rejected indication in response to a determination that the non-biometric input is valid.

8. The computing device of claim 4, wherein to mark the feature vector with the indication of correctness of the authentication classification comprises to mark the feature vector with an accepted indication in response to a determination that the authentication classification indicates a successful authentication.

9. The computing device of claim 7, wherein the classification determination module is further to determine whether a predetermined number of feature vectors have been verified and adjust the weight in response to a determination that the predetermined number of feature vectors have been verified.

10. A method for authenticating a user of a multi-factor authentication including a computing device, the method comprising:
collecting, by a computing device, sensor data related to the user and an environment of the computing device from a plurality of sensors of the computing device;
determining, by the computing device, a reliability score for each of a plurality of biometric authentication factors submitted by the user based on the sensor data, the reliability score indicating a weight applied to a corresponding biometric authentication factor;
generating, by the computing device, a feature vector that includes the reliability score and a confidence score for each biometric authentication factor, the confidence score indicating a likelihood of authentication of the biometric authentication factor;
determining, by the computing device, a historical login pattern associated with the user, wherein the historical login pattern is representative of historical login attempts by the user in different environments;
determining, by the computing device, a present environment of the user by comparing a present time when the biometric authentication factors were submitted by the user to the historical login pattern;
matching, by the computing device, the present environment with one or more login attempts in the historical login pattern;
determining, by the computing device, an authentication result for each of the one or more matched login attempts in the historical login pattern associated with the present environment;
selectively increasing or decreasing, by the computing device and in response to a determination that the present environment matches an environment of a login attempt in the historical login pattern, a weight associated with one or more of the confidence scores in the feature vector as a function of the determination of the authentication results of the one or more matched login attempts associated with the present environment;
determining, by the computing device, an authentication classification as a function of the feature vector including marking the feature vector with an indication of correctness of the authentication classification;
producing, by the computing device and as a function of the indication of correctness, a classification rule that defines an amount by which one or more of the weights is to be adjusted in a subsequent login attempt; and
performing, by the computing device, an authorization action based on the authentication classification.

11. The method of claim 10,
wherein producing the classification rules comprises producing the classification rules via a machine-learning classifier based on the historical login pattern.

12. The method of claim 10, wherein determining the reliability score for each of the plurality of biometric authentication factors used in the multi-factor authentication comprises analyzing the sensor data from the plurality of sensors and determining the reliability score for each of the plurality of biometric authentication factors based on one or more physical factors of the environment of the computing device during the multi-factor authentication.

13. The method of claim 10, wherein determining the authentication classification based on the feature vector comprises: (i) performing a feature vector analysis on the feature vector and (ii) determining the authentication classification based on the feature vector analysis.

14. The method of claim 10, further comprising:
verifying the feature vector based on a non-biometric input from the user in response to the authentication classification indicating an unsuccessful authentication;
marking the feature vector with a rejected indication in response to determining the non-biometric input is valid; and
adjusting the weight in response to a determination that a predetermined number of feature vectors have been verified.

15. The method of claim 10, wherein performing the authorization action comprises allowing access to the user to at least a portion of the computing device in response to the authentication classification indicating a successful authentication, or denying access to the user to at least a portion of the computing device in response to the authentication classification indicating an unsuccessful authentication.

16. The method of claim 12, wherein determining the reliability score for each of the plurality of biometric authentication factors based on the one or more physical factors of the environment comprises collecting data of the environment that impacts a reliability of one or more of the plurality of biometric authentication factors via one or more sensors of the computing device.

17. One or more non-transitory, computer-readable storage media comprising a plurality of instructions stored thereon that in response to being executed cause a computing device to:
   collect sensor data related to a user and an environment of the computing device from a plurality of sensors of the computing device;
   determine a reliability score for each of a plurality of biometric authentication factors submitted by the user based on the sensor data, the reliability score indicates a weight applied to a biometric authentication factor that corresponds to the reliability score;
   generate a feature vector that includes the reliability score and a confidence score for each biometric authentication factor, the confidence score indicating a likelihood of authentication of the biometric authentication factor;
   determine a historical login pattern associated with the user, wherein the historical login pattern is representative of historical login attempts by the user in different environments;
   compare a present time when the biometric authentication factors were submitted by the user to the historical login pattern to determine a present environment of the user at the present time;
   match the present environment with one or more login attempts in the historical login pattern;
   determine an authentication result for each of the one or more matched login attempts in the historical login pattern associated with the present environment;
   selectively increase or decrease, in response to a determination that the present environment matches an environment of a login attempt in the historical login pattern, a weight associated with one or more of the confidence scores in the feature vector as a function of the determination of the authentication results of the one or more matched login attempts associated with the present environment;
   determine an authentication classification as a function of the feature vector including marking the feature vector with an indication of correctness of the authentication classification;
   produce, as a function of the indication of correctness, a classification rule that defines an amount by which one or more of the weights is to be adjusted in a subsequent login attempt; and
   perform an authorization action based on the authentication classification.

18. The one or more non-transitory, computer-readable storage media of claim 17, wherein to produce the classification rules comprises to produce the classification rules via a machine-learning classifier based on the historical login pattern.

19. The one or more non-transitory, computer-readable storage media of claim 17, wherein to determine the reliability score for each of the plurality of biometric authentication factors used in a multi-factor authentication comprises to analyze the sensor data from the plurality of sensors and to determine the reliability score for each of the plurality of biometric authentication factors based on one or more physical factors of the environment of the computing device used in the multi-factor authentication.

20. The one or more non-transitory, computer-readable storage media of claim 17, wherein to determine the authentication classification based on the feature vector comprises to: (i) perform a feature vector analysis on the feature vector and (ii) determine the authentication classification based on the feature vector analysis.

21. The one or more non-transitory, computer-readable storage media of claim 17, further comprising a plurality of instructions that in response to being executed cause the computing device to:
   receive, from a remote computing device, historical data indicative of historical authentication classifications based on sensor data from other computing devices; and
   determine the authentication classification based additionally on the received historical data.

22. The one or more non-transitory, computer-readable storage media of claim 17, further comprising a plurality of instructions that in response to being executed cause the computing device to assign a weight to a confidence value associated with a facial recognition authentication factor as a function of a tilt of the face of the user.

23. The one or more non-transitory, computer-readable storage media of claim 19, wherein to determine the reliability score for each of the plurality of biometric authentication factors based on the one or more physical factors of the environment comprises to collect data of the environment that impacts a reliability of one or more of the plurality of biometric authentication factors via one or more sensors of the computing device.

24. The one or more non-transitory, computer-readable storage media of claim 20, wherein to mark the feature vector with the indication of correctness of the authentication classification comprises to mark the feature vector with an accepted indication in response to the authentication classification that indicates a successful authentication, and to verify the feature vector based on a non-biometric input from the user in response to the authentication classification that indicates an unsuccessful authentication and mark the feature vector with a rejected indication in response to a determination that the non-biometric input is valid.

25. The one or more non-transitory, computer-readable storage media of claim 24, wherein to verify the feature vector based on the non-biometric input from the user comprises to verify the feature vector based on a text-based input from the user.

* * * * *